(12) United States Patent
Cugi et al.

(10) Patent No.: US 11,349,640 B2
(45) Date of Patent: May 31, 2022

(54) DYNAMIC BROADCAST CONTENT ACCESS MANAGEMENT SYSTEMS AND METHODS

(71) Applicant: Intertrust Technologies Corporation, Sunnyvale, CA (US)

(72) Inventors: Guido Cugi, Sunnyvale, CA (US); Vincenzo Rubino, San Francisco, CA (US); Pierre Chavanne, Davis, CA (US); Jean-René Ménand, Los Altos, CA (US)

(73) Assignee: Intertrust Technologies Corporation, Milpitas, CA (US)

( * ) Notice: Subject to any disclaimer, the term of this patent is extended or adjusted under 35 U.S.C. 154(b) by 90 days.

(21) Appl. No.: 17/019,101

(22) Filed: Sep. 11, 2020

(65) Prior Publication Data

US 2021/0083842 A1 Mar. 18, 2021

Related U.S. Application Data

(60) Provisional application No. 62/899,567, filed on Sep. 12, 2019.

(51) Int. Cl.
*H04L 29/06* (2006.01)
*H04L 9/06* (2006.01)
(Continued)

(52) U.S. Cl.
CPC ............ *H04L 9/065* (2013.01); *H04L 9/0861* (2013.01); *H04L 9/14* (2013.01); *H04N 21/4408* (2013.01)

(58) Field of Classification Search
CPC ......... H04L 9/065; H04L 9/0861; H04L 9/14; H04N 21/4408; H04N 21/4623; H04N 21/4405
See application file for complete search history.

(56) References Cited

U.S. PATENT DOCUMENTS 5,982,891 A 11/1999 Ginter et al.
7,398,544 B2 7/2008 Candelore et al.
(Continued)

FOREIGN PATENT DOCUMENTS

JP 3754912 B2 * 3/2006 ............. G11B 27/34
WO 2003043310 5/2003
(Continued)

OTHER PUBLICATIONS

English Translation of WO2017193978, Published Nov. 16, 2017 (21 pgs).
(Continued)

*Primary Examiner* — John B King
(74) *Attorney, Agent, or Firm* — John P. Davis; Thayne and Davis LLC

(57) ABSTRACT

This disclosure relates to, among other things, systems and methods for the secure management and distribution of electronic content over broadcast communication channels. Certain embodiments disclosed herein may allow for implementation of a multi-tenant conditional access system whereby a client device may configure itself between multiple broadcast service operators. Robust key generation and management techniques are also described that may use a derived key structure to protect control words used to descramble broadcast content, providing additional measures of security and implementation redundancy.

18 Claims, 9 Drawing Sheets

(51) Int. Cl.
  *H04L 9/08* (2006.01)
  *H04L 9/14* (2006.01)
  *H04N 21/4408* (2011.01)

(56) References Cited

U.S. PATENT DOCUMENTS

| | | | |
|---|---|---|---|
| 7,492,897 B1 | 2/2009 | Eskicioglu et al. | |
| 7,636,846 B1 | 12/2009 | Eskicioglu | |
| 8,782,687 B2 | 7/2014 | Ansari et al. | |
| 10,476,883 B2 | 11/2019 | Carson et al. | |
| 2004/0017914 A1* | 1/2004 | Tada | G11B 20/0071 380/201 |
| 2004/0098169 A1 | 5/2004 | Abe et al. | |
| 2004/0221324 A1 | 11/2004 | Ansari et al. | |
| 2006/0107285 A1* | 5/2006 | Medvinsky | H04N 21/835 725/25 |
| 2006/0253401 A1* | 11/2006 | Kim | G06Q 20/1235 705/59 |
| 2007/0140488 A1* | 6/2007 | Dharmaji | H04N 7/165 380/212 |
| 2007/0177733 A1* | 8/2007 | Wajs | H04L 9/0825 380/228 |
| 2009/0113206 A1* | 4/2009 | Shen-Orr | H04L 9/3268 713/158 |
| 2010/0228971 A1* | 9/2010 | Carles | H04N 21/4623 713/163 |
| 2012/0257749 A1* | 10/2012 | Gremaud | H04N 21/4623 380/210 |
| 2013/0315396 A1 | 11/2013 | Bauer et al. | |
| 2014/0123169 A1 | 5/2014 | Koukarine | |
| 2016/0254907 A1* | 9/2016 | Messerman | H04N 21/2347 380/279 |
| 2017/0300668 A1* | 10/2017 | Bawa | G06F 21/105 |
| 2017/0318263 A1 | 11/2017 | Cocchi et al. | |
| 2017/0373778 A1* | 12/2017 | Phirmis | G06F 21/10 |
| 2018/0279002 A1 | 9/2018 | Cugi et al. | |

FOREIGN PATENT DOCUMENTS

| | | | |
|---|---|---|---|
| WO | WO-2004112004 A2 * | 12/2004 | G11B 20/00855 |
| WO | 2017193978 | 11/2017 | |

OTHER PUBLICATIONS

"A conditional access system with efficient key distribution and revocation for mobile pay-TV systems." Yeh et al. ACM Transactions on Multimedia Computing Communications and Applications. Association for Computing Machinery. vol. 9, No. 3. Published Jul. 7, 2013 (20 pgs).

"SMIT Corporation Jointly Introduces Market First Integrated CI Plus Conditional Access Module." SMIT Corporation. Accessible at www.smit.com.cn/en/index.php?m=content&c=index&a=show&catid=327&id=1678. Published Aug. 23, 2019 (2 pgs).

Oct. 27, 2020 International Search Report. PCT/US2020/050564. (8 pgs).

Oct. 27, 2020 Written Opinion of the International Search Authority. PCT/US2020/050564. (11 pgs).

* cited by examiner

DYNAMIC BROADCAST CONTENT ACCESS MANAGEMENT SYSTEMS AND METHODS

RELATED APPLICATIONS

This application claims the benefit of priority under 35 U.S.C. § 119(e) to U.S. Provisional Patent Application No. 62/899,567, filed Sep. 12, 2019, and entitled "Dynamically Configurable Broadcast Access Management Systems and Methods," the contents of which is hereby incorporated by reference in its entirety.

COPYRIGHT AUTHORIZATION

Portions of the disclosure of this patent document may contain material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

SUMMARY

The present disclosure relates generally to access management systems and methods. More specifically, but not exclusively, the present disclosure relates to systems and methods that facilitate a multi-tenant conditional access system ("CAS") and/or robust key provisioning and management by client devices for use in connection with a CAS.

Broadcast content signals such as, for example, satellite signals and/or broadcast television signals, may use a CAS to protect associated content. A broadcast content operator may scramble and/or encrypt a cleartext broadcast transport stream transport stream ("TS") (e.g., a MPEG-2-encoded TS) using a control word ("CW"), and may transmit the scrambled stream over the broadcast signal. In certain broadcast signals, a broadcast TS may further include one or more entitlement control messages ("ECMs") and/or associated message fields and/or entitlement management messages ("EMMs") and/or associated message fields.

An ECM of a broadcast TS may comprise a CW encrypted using a content key ("CK") that may be used to descramble and/or otherwise decrypt scrambled content. Consistent with embodiments disclosed herein, an EMM of a broadcast content TS and/or a license packaged in an EMM may comprise the CK encrypted with a public device key and/or a group key. Upon receipt of an EMM and an ECM, a device may decrypt the CK included in the EMM (or a licensed packaged in the EMM) using a device key and/or group key, decrypt the CW included in the ECM using the decrypted CK, and descramble and/or otherwise decrypt the scrambled content stream using the CW.

Traditional broadcast content access systems may be bound to a single broadcast operator. A client device, which may in some instances comprise a set-top-box ("STB") and/or a conditional access module ("CAM"), may be subsidized by the broadcaster operator and configured to provide access to the content of the single operator. When a consumer wants to switch between operators, the consumer may be required to replace either the STB or the CAM with a STB or CAM associated with the new operator.

Embodiments of the disclosed systems and methods may facilitate a multi-tenant CAS that may allow a client device to configure itself between multiple network operators. For example, when embodiments of the disclosed systems and methods are integrated into a client device (e.g., a smart TV set, a CAM, a STB, and/or the like), the client device may dynamically configure itself to become bound to multiple operators. Embodiments of the disclosed systems and methods may allow a consumer to subscribe to multiple broadcast services without the need to replace hardware, as the client device may configure itself for each operator. Embodiments disclosed herein may, in some implementations, allow for generic client devices (e.g., smart TVs) to be sold in markets where multiple operators are available by using a mechanism to allow the device to automatically switch between network operators.

In various disclosed embodiments, robust key generation and/or provisioning systems and methods may be employed in connection with a multi-tenant CAS implementation. In some embodiments, a device manufacturer may provision client devices with one or more cryptographic keys including, for example and without limitation, unique device keys and/or group keys. The provisioned keys may, in certain embodiments, be generated by a key service having a trusted relationship with a device manufacturer and/or a license and/or CAS service.

When initially tuned to a broadcast signal associated with a particular operator and/or an initializing an operator application, the client device may engage in an initialization process to generate one or more derived keys (e.g., derived device and/or group keys) based on the provisioned device and/or group keys. The one or more generated derived keys may be used in connection with descrambling the broadcast signal. For example, the device may use at least one generated derived key to decrypt a CK included in an EMM of a broadcast TS (and/or a license packaged in the EMM), decrypt a CW included in an ECM of the broadcast TS using the decrypted CK, and descramble and/or otherwise decrypt the scrambled content of the broadcast TS using the decrypted CW. In various embodiments, multiple derived keys may be generated and/or used in connection with various CAS operations performed by the client device, which may provide for increased security robustness and/or redundancy in the event one or more of the derived keys are compromised. Group addressing techniques may be further employed in connection with various disclosed embodiments to allow for license delivery to a group of subscribing client devices, which may reduce demands associated with delivering individualized licenses to specific devices.

Various embodiments of the disclosed systems and methods may provide for improved broadcast service operator flexibility, allowing an operator to deliver content and/or and associated license information to a variety of types of client devices without investing in operator-specific specialized hardware. This may allow the operator to focus efforts on delivering content instead of developing specialized hardware. In turn, consumers may be able to access content offered by multiple broadcast operators with their devices without having to purchase new specialized hardware or generating new electronic waste. Device manufacturers may benefit from producing devices that may be used in a wider variety of contexts without being bound to a single broadcast operator or requiring certain specialized hardware (e.g., CAM-specialized hardware).

In various embodiments, a method for managing electronic content performed may include receiving a broadcast content stream (e.g., an MPEG-2 encoded transport stream) by a client device such as, for example and without limitation, a television, a STB, a CAM, and/or the like. The broadcast content stream comprising a plurality of encrypted content packets, at least one encrypted CW packet comprising at least one encrypted CW, and at least one license packet. In certain embodiments, the plurality of encrypted content packets be encrypted using the at least one CW. A request may be received by the client device to render the broadcast content stream.

The client device may process the at least one license packet. In certain embodiments, the at least one license packet may comprise an entitlement management message packet. In some embodiments, target information may be associated with the at least one license packet that may be used, at least in part, to identify an initial secret key provisioned to the client device. A series of derived keys may be generated that comprise a plurality of derived keys generated based, at least in part, on the initial secret key using a key derivation function that, in certain embodiments, may comprise a one-way key derivation function. In some embodiments, the initial secret key may comprise a unique device key. In further embodiments, the initial secret key may comprise a group key such as a manufacturer group key and/or an operator group key (e.g., a group key associated with a particular broadcast service operator). The generated series of derived keys may be stored in a database associated with an associated broadcast service operator.

A CK included in the at least one license packet may be decrypted using at least one of the derived keys in the series of derived keys. In some embodiments, decrypting the CK included in the at least one license packet using the at least one of the derived keys in the series of derived keys may include first attempting to decrypt the CK using the terminal derived key in the series of the derived keys (i.e., the final derived key in the series). If the decryption is not successful, a derived key preceding the terminal derived key in the series of derived keys may be used (e.g., a key immediately preceding the terminal derived key or a key earlier in the series of derived keys).

The CW included in the at least one encrypted control word packet, which may comprise an entitlement control message packet, may be decrypted using the decrypted CK, and the broadcast content stream may be descrambled by decrypting the plurality of encrypted content packets using the decrypted CW. The descrambled broadcast content stream may then be rendered by the client device.

BRIEF DESCRIPTION OF THE DRAWINGS

The inventive body of work will be readily understood by referring to the following detailed description in conjunction with the accompanying drawings, in which.

DETAILED DESCRIPTION

A description of the systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure may be understood by reference to the drawings, wherein like parts may be designated by like numbers or descriptions. The components of the disclosed embodiments, as generally described and/or illustrated in the figures herein, could be arranged and designed in a wide variety of different configurations. Thus, the following description of the embodiments of the systems and methods of the disclosure is not intended to limit the scope of the disclosure, but is merely representative of possible embodiments of the disclosure. In addition, the steps of any method disclosed herein do not necessarily need to be executed in any specific order, or even sequentially, nor need the steps be executed only once, unless otherwise specified.

Embodiments disclosed herein may allow for the secure management of content broadcast to one or more client devices. In certain embodiments, client devices may be dynamically configured for binding to multiple broadcast service operators using a multi-tenant CAS implementation, allowing a consumer to subscribe to multiple broadcast services without the need to replace hardware. In various disclosed embodiments, key generation, provisioning, and management techniques may be employed that may provide increased security robustness and/or key redundancy. For example, as described in more detail below, one or more derived keys may be generated based on device and/or group keys provisioned to client devices. The derived keys may be used to decrypt CKs included in an EMM and/or an associated packaged license in a broadcast TS, which in in turn may be used to decrypt a CW included in an ECM and/or another field within the broadcast TS. The decrypted CW may then be used descramble and/or otherwise decrypt content included in the broadcast TS for playback by the client device.

Multi-Tenant Broadcast Content Management Architecture Overview

Figure 1:
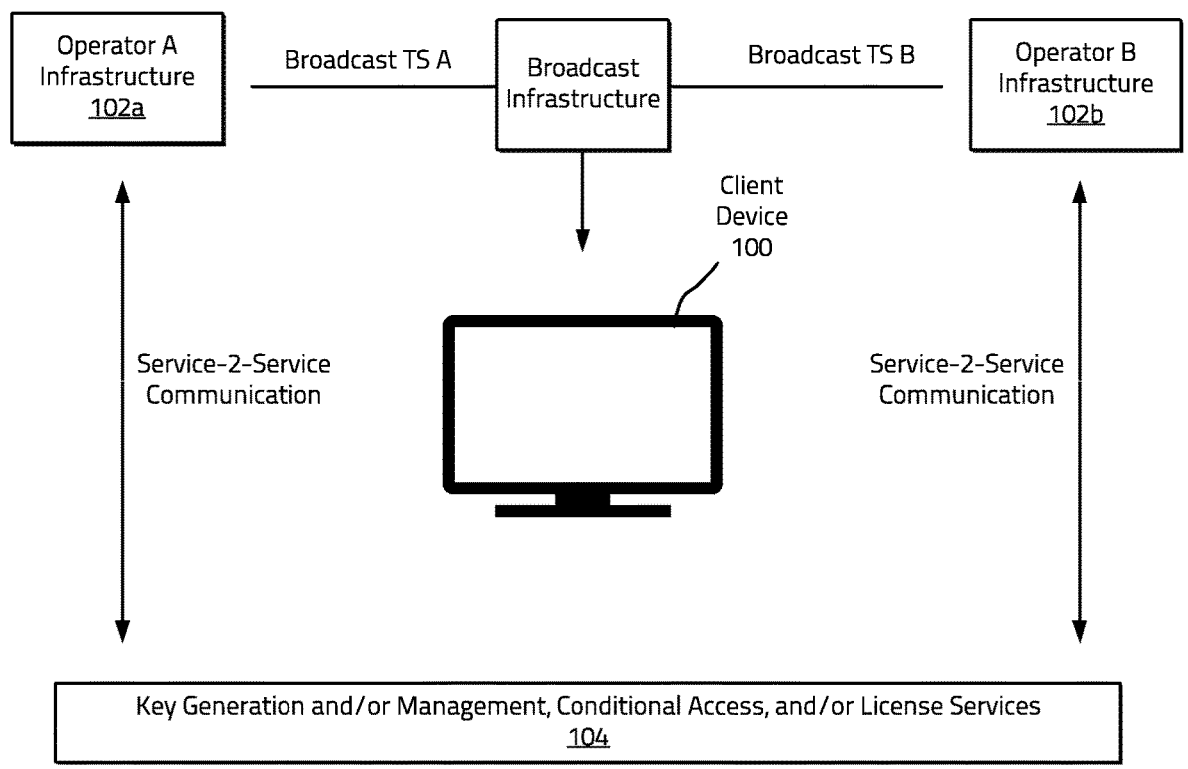
FIG. 1 illustrates an example of an architecture of a broadcast system implementing a multi-tenant CAS architecture consistent with various embodiments of the present disclosure.

Embodiments disclosed herein may allow for the secure management of content distributed to one or more client devices by one or more broadcast service operators. FIG. 1 illustrates an example of an architecture of a broadcast system implementing a multi-tenant CAS architecture consistent with various embodiments of the present disclosure. In certain embodiments, content management functionality may be implemented using, at least in part, one or more services that may include key generation and/or management services, CAS services, and/or license services 104. In various embodiments, one or more one or more broadcast service operators 102a, 102b may interact with one or more key generation and/or management services, CAS services, and/or license services 104 in connection with various content management processes including, for example and without limitation, key and/or license generation processes.

Although not specifically shown, in various embodiments, the client device 100 may be configured to interact (e.g., receive key information, license information, and/or the like) directly with one or more key generation and/or management services, CAS services, and/or license services 104 via a bidirectional communication channel, such as a broadband Internet connection, and/or unidirectional communication channel, such as a broadcast signal. In this manner, various embodiments may provide for secure and relatively cost-effective (in some instances card-less) content access management that, among other things, enables secure playback of scrambled digital video broadcasting ("DVB") signals, as well as over-the-top ("OTT") streams on connected devices (e.g., smart TVs, set top boxes, etc.).

As shown, a client device 100 may be configured to receive broadcast content provided by the infrastructure of one or more broadcast service operators 102a, 102b via one or more broadcast TSs—Broadcast TS A and Broadcast TS B in the illustrated example. A client device 100 may comprise a television, and STB, and CAM, a streaming and/or other content device, and/or any other system and/or device that may be used in connection with receiving, managing, and/or displaying broadcast and/or broadband content received from one or more content providers and/or services. In some embodiments, a client device 100 may comprise a broadcast device, which may not necessarily be capable of bidirectional communication with one or more other systems and/or services (e.g., key generation and/or management, CAS, and/or license services 104). In further embodiments, as described above, a client device 100 may comprise a connected device, which may be capable of receiving content and/or other information and/or transmitting information to/from one or more systems and/or services via a communication channel. In some embodiments, a connected device may comprise a connected broadcast device ("CBD"), which may be capable of receiving content from a broadcast channel (or other unidirectional communication channel) and/or a bidirectional communication channel, such as an active broadband connection and/or the Internet. In certain embodiments, a client device 100 may comprise a hybrid device supporting both broadcast and OTT connectivity.

Consistent with various embodiments, and as described in more detail below, a client device 100 may be provisioned with one or more keys (e.g., device keys and/or group keys). In some embodiments, the client device 100 may be provisioned with keys by a device manufacturer as part of the manufacturing process. In further embodiments, the client device 100 may be provisioned with keys as part of an initialization and/or personalization process. For example, in some embodiments, the client device 100 may receive keys from the device manufacturer and/or an associated service (e.g., a key generation and/or management service 104). Using the provisioned keys, the client device 100 may generate one or more derived keys that may be used directly and/or indirectly to decrypt scrambled content included in the broadcast TSs received from the broadcast service operators 102a, 102b. For example, the client device 100 may derive one or more keys that may be used to decrypt CKs included in an EMM and/or an associated packaged license in a broadcast TS, which in in turn may be used to decrypt a CW included in an ECM and/or another field within the broadcast TS. The decrypted CW may then be used descramble and/or otherwise decrypt content included in the broadcast TS for playback by the client device 100.

In some embodiments, before configuration and/or binding with a particular broadcast service operator, a client device 100 may begin in an uninitialized and/or unpersonalized state. In this state, the client device 100 may be provisioned with a set of one or more unique device keys and/or a manufacturing key such as a group key, which in certain instances herein may be referred to as a Group0 key. The initialized client device 100 may not necessarily be bound and/or otherwise configured to a particular broadcast service operator.

When the client device 100 is tuned to a particular broadcast operator service for the first time and/or when the client device 100 runs an application associated with a particular broadcast service following selection and/or acceptance of the operator terms of service by a user, the client device 100 may use the initially provisioned unique device keys and/or manufacturing key to generate one or more derived keys that may be network operator-specific. In at least one non-limiting example, when a client device 100 is tuned to a particular broadcast service for the first time, the device 100 may use unique information associated with the operator of the broadcast service (e.g., information obtained from a conditional access table ("CAT")) to derive one or more network operator-specific manufacturing and/or group keys from the originally provisioned manufacturing and/or group keys. In some embodiments, license information that may include encrypted content keys included in an EMM of a broadcast TS delivered by a particular operator and/or any operator-specific origin information that may be used in connection with generating operator-specific derived keys may be stored in an operator-specific repository. If the user tunes the client device 100 to a different operator network, this process may be repeated for the different operator.

As described above, multiple operators—Operator A and Operator B—may broadcast content to the same client device 100 and may operate independently and/or relatively independently of one another. If one of the operators decides to suspend the ability of the client device 100 to access its content (e.g., due to the user device 100 becoming no longer compliant with an operator-specific requirement), CAS mechanisms consistent with embodiments of the disclosed systems and methods may allow for the suspension of the device 100 by one operator without otherwise affecting the ability of the client device 100 to access content received from other operators.

After being configured to access a broadcast network, when the client device 100 attempts to access the protected content of a channel belonging to a specific network operator, unique network information from a program map table ("PMT") may be used to identify a network operator specific repository to look up the proper license and/or key information. In some embodiments, unique operator information located in the CAT and the PMT may be the same and/or similar.

Initial Key Generation and Provisioning

Figure 2:
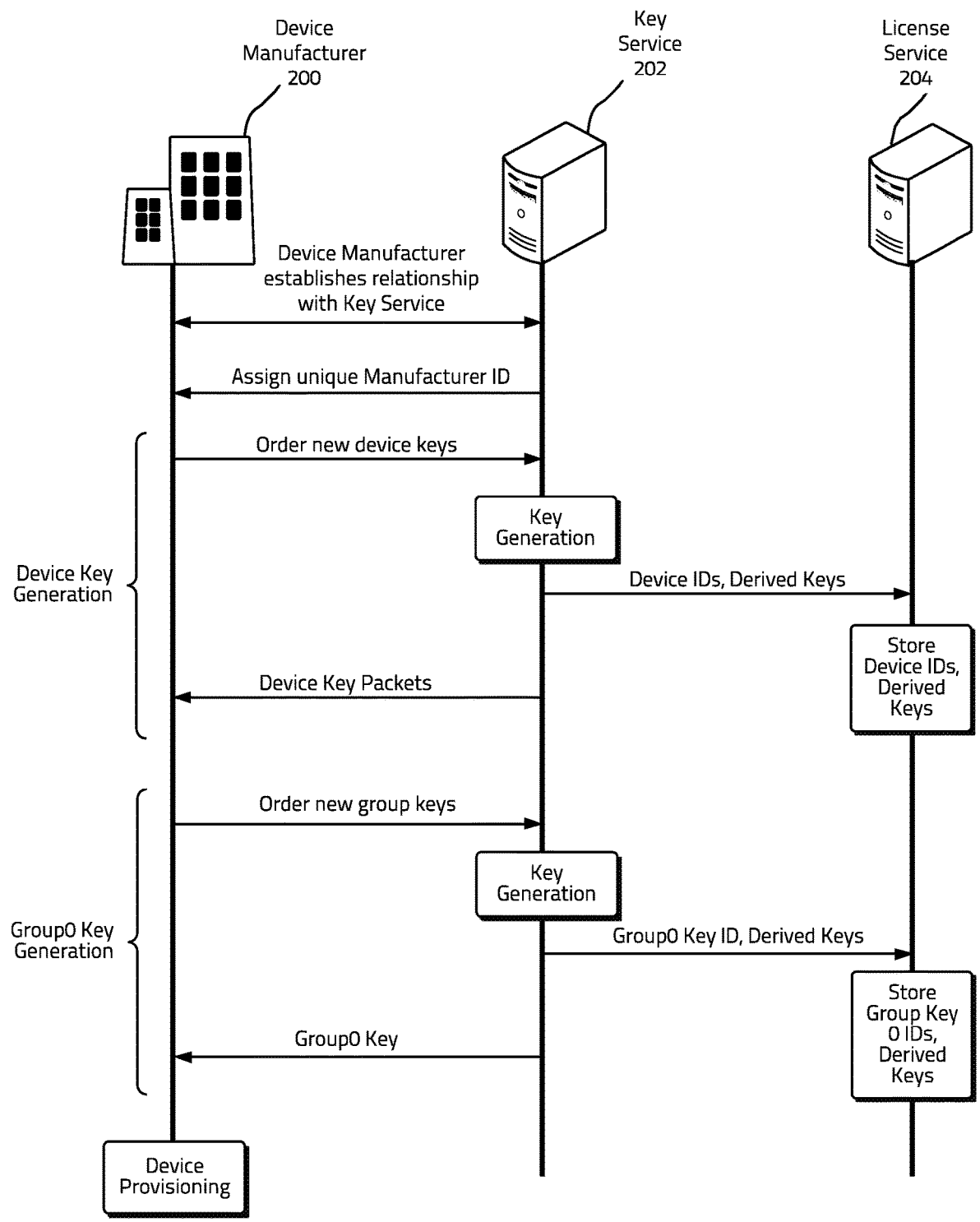
FIG. 2 illustrates an example of key generation and provisioning consistent with various embodiments of the present disclosure.

FIG. 2 illustrates an example of key generation and provisioning consistent with various embodiments of the present disclosure. As shown, a device manufacturer 200 may establish a relationship with a key service 202 to generate one or more cryptographic keys used in connection with CAS management processes. As part of this relationship, the key service 202 may assign the device manufacturer 200 a unique manufacturer ID.

In some embodiments, the device manufacturer 200 may issue a device key generation request to the key service 202. Upon receipt of the request, the key service 202 may engage in a device key generation process to generate device personalization packets that may include one or more unique device keys and/or associated device IDs. The device IDs, one or more keys derived from at least one of the unique device keys, and/or other associated information, which may be collectively referred to in some instances as exhaust, may be communicated from the key service 202 to a license service 204. As discussed in more detail below, the license service 204 may be configured to issue licenses to a broadcast service operator for inclusion in a broadcast TS and/or perform other license and/or CAS related functions. The license service 204 may store the received device IDs and/or associated derived keys for use in connection with the generation of licenses and/or encrypting associated CKs (which may be generated by the key service 202 and/or another key generation service).

The generated device personalization packets, which may comprise one or more unique device keys, associated device IDs, and/or other credentials, may be communicated from the key service 202 to the device manufacturer 200 in response to the device key generation request. In various embodiments, the device key generation process may be performed by the key service 202 whenever the key service 202 receives a request to generate a device key and/or a batch of device keys for provisioning to one or more client devices from the device manufacturer 200.

In certain embodiments, the device manufacturer 200 may also wish to provision client devices with one or more manufacturer group keys, which in certain instances herein may be referred to as Group0 keys. In some embodiments, the group keys may be common to every client device produced by the device manufacturer 200. In further embodiments, group keys may be common certain subsets and/or groups of client devices produced by the device manufacturer including, for example and without limitation, client devices of the same model, client devices produced during the same time period, and/or the like. In some embodiments, client devices may be provisioned with one group key. In further embodiments, client devices may be provisioned with multiple group keys.

In some embodiments, the device manufacturer 200 may issue a group key generation request to the key service 202. Upon receipt of the request, the key service 200 may engage in a group key generation process to generate one or more group keys and/or associated group key ID information. The group key IDs, one or more keys derived from at least one of the generated group keys, and/or other associated information, which may be collectively referred to in some instances as exhaust, may be communicated from the key service 202 to the license service 204. The license service 204 may store the received group key IDs and/or associated derived keys for use in connection with the generation of licenses and/or encrypting associated CKs (which may be generated by the key service 202 and/or another key generation service).

The generated group key and/or associated group key ID may be communicated from the key service 202 to the device manufacturer 200 in response to the group key generation request. In various embodiments, the group key generation process may be performed by the key service 202 whenever the key service 202 receives a request to generate a group key and/or a batch of group keys for provisioning to one or more client devices from the device manufacturer 200.

After keys have been generated by the key service 202 (e.g., device keys and/or group keys) and provided to the device manufacturer 200, the device manufacturer 200 may provision client devices with the keys. In some embodiments, a client device may be provisioned with one or more unique device keys (e.g., included as part of a device personalization packet) and a Group0 key.

In certain embodiments, device and/or group keys may be provisioned to a client device as part of the device manufacturing process. In further embodiments, device and/or group keys may be communicated to a client device from the device manufacturer and/or another key provisioning service as part of a device personalization and/or initialization configuration process. For example, a client device may be personalized via an online personalization process where the device may acquire personalization information automatically from a device manufacturer and/or another key and/or licensing provisioning service, or an offline personalization service where there device may acquire personalization information through flashing into a chipset of a client device during one of the manufacturing phases. In connection with connected broadcast client devices, in certain embodiments, a broadcast service operator may trigger the online acquisition of the device personality upon the activation of a user subscription via a content service subscriber management system.

Various information communicated between the device manufacturer 200, the key service 202, and/or the license service 204 may be transmitted via one or more protected and/or otherwise secure communication channels. For example and without limitation, in various embodiments, certain information communicated between device manufacturer 200, the key service 202, and/or the license service 204, including various keys and/or associated information, may be protected using public-key and/or asymmetric cryptographic communication protocols.

It will be appreciated that a number of variations can be made to the architecture, relationships, and examples presented in connection with FIG. 2 within the scope of the inventive body of work. For example, certain functionalities of the device manufacturer 200, the key service 202, and/or the license service 204 may be performed by and/or otherwise integrated in a single entity, system, and/or service, and/or any suitable combination of entities, systems, and/or services. In at least one non-limiting example, certain functionality provided the key service 202 and the license service 204 may be integrated into a single service. Thus, it will be appreciated that the architecture, relationships, and examples presented in connection with FIG. 2 are provided for purposes of illustration and explanation, and not limitation.

Derived Key Generation

Figure 3:
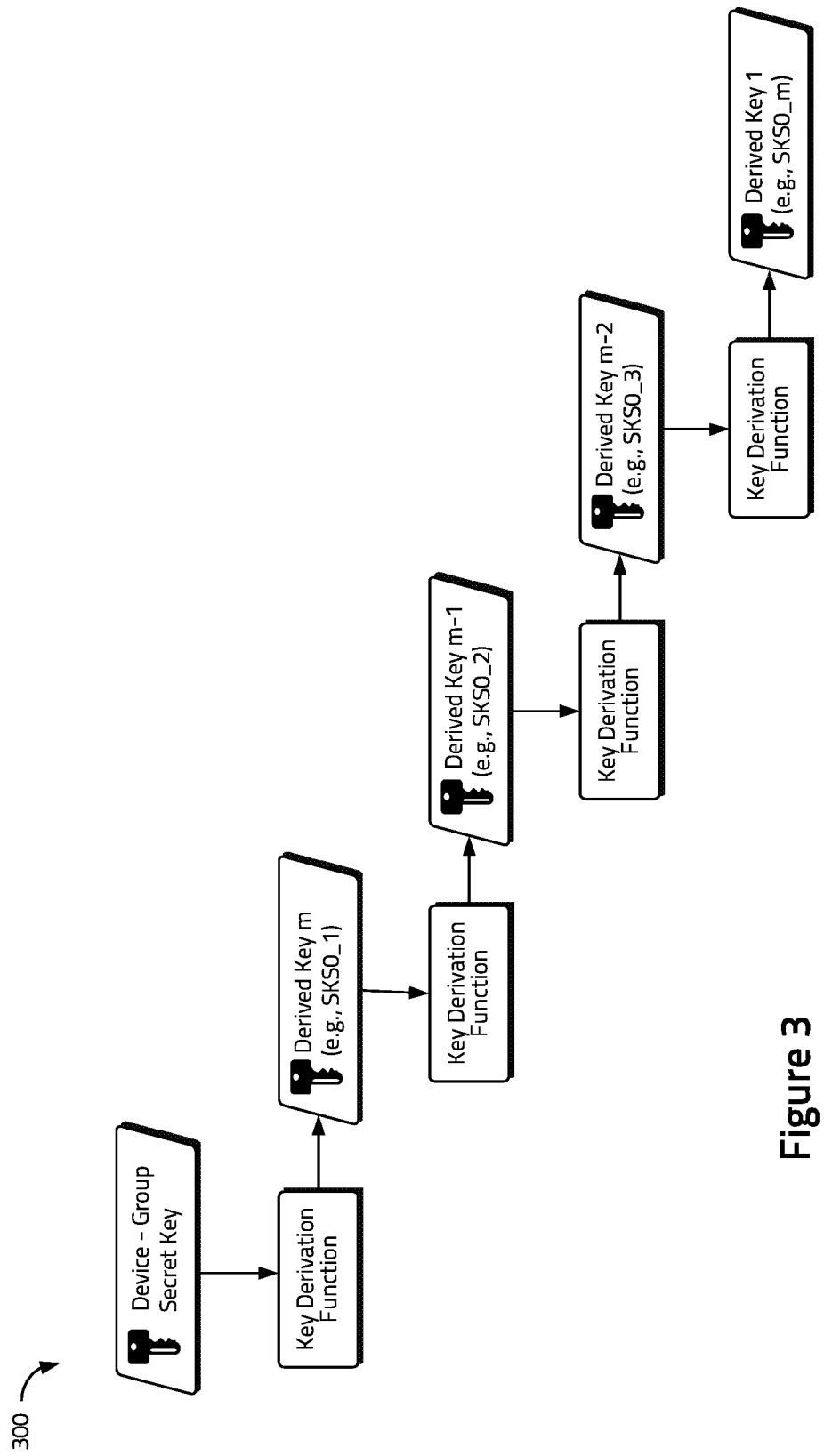
FIG. 3 illustrates an example of derived key generation consistent with various embodiments of the present disclosure.

In various embodiments, when a client device is tuned to a particular broadcast service operator and/or when the client device runs an application associated with a particular broadcast service operator for the first time, the device may use the provisioned unique device key and/or group keys to generate one or more network operator-specific derived keys. Derived keys may be further generated by a license service and/or other service in connection with generating license packets and/or EMMs. FIG. 3 illustrates an example of derived key generation 300 consistent with various embodiments of the present disclosure.

As shown, an initial secret key, which may comprise a unique device key included in a provisioned device personalization packet or a group key (e.g., a Group0), may be provided to a key derivation function. Consistent with embodiments disclosed herein, the key derivation function may comprise a one-way key derivation function. The key derivation function may receive one or more input parameters that may comprise, for example and without limitation, an initial secret key, a type of cipher, a length of key, and/or other seed information which may be referred to as label and/or context information. In certain embodiments, a National Institute of Standards and Technology ("NIST") 800-108 key derivation function may be employed to generate one or more derived keys consistent with embodiments disclosed herein, although it will be appreciated that a variety of other suitable key derivation functions may also be used.

If derived device keys are being generated, the key derivation function may receive the initial unique device key, context information which may comprise a unique device ID associated with the unique device key, and/or the label information associated with the unique device key and/or to-be generated derived keys (e.g., "CAS key" or the like). In various embodiments, a series of m derived device keys may be generated. The key derivation function may produce a first derived device key—which in the illustrated example is labeled as Derived Device Key m. Consistent with embodiments disclosed herein, a series of other derived device keys may be generated. For example, as illustrated, Derived Device Key m may be provided to the key derivation function to generate a second derived device key-Derived Device Key m−1, which may be provided to the key derivation function to generate a third derived device key—Derived Device Key m−2, which may be provided to the key derivation function to generate a fourth derived device key-Derived Device Key 1 (i.e., when m=4 as in the illustrated non-limiting example).

Although various embodiments disclosed herein are described in connection with generating four derived device keys, it will be appreciated that any suitable number m of derived device keys may be used. In some embodiments, a single derived device key may be employed. In further embodiments, including the various illustrated examples and embodiments described herein, a plurality of derived device keys may be used.

In certain embodiments where the key derivation function comprises a one-way function, if one derived key of a plurality of derived is compromised it may not necessarily comprise other derived device keys (and/or a subset of the derived device keys). For example, if Derived Device Key 1 is compromised, Derived Device Keys m, m−1, and m−2 may not be compromised. If Derived Device Key m−2 is compromised, Derived Device Key 1 may also be compromised, but Derived Device Keys m−1 and m may not be compromised. Using a series of derived device keys consistent with embodiments disclosed herein may therefore provide a measure of improved security and key redundancy in connection with various aspects of the disclosed CAS implementations.

If derived group keys are being generated, the key derivation function may receive the initial group key, which may comprise a manufacturer Group0 key and/or an operator group key, context information which may comprise a unique ID associated with the group key (e.g., SKS0 and/or another manufacturer ID in the case of a manufacturer Group0 key and/or a unique operator ID in the case of an operator-specific group key), and/or label information associated with the group key and/or the to-be generated derived keys (e.g., "CAS key" in the case of a manufacturer Group0 key or "CAS Operator SKS" in the case of an operator-specific group key or the like).

In various embodiments, a series of m derived group keys may be generated. The key derivation function may produce a first derived group key—which in some instances may be labeled as Derived Group Key m and/or "SKS01". Consistent with embodiments disclosed herein, a series of other derived group keys may be generated. For example, as illustrated, when m=4, Derived Group Key m may be provided to the key derivation function to generate Derived Group Key m−1 (which may be labeled as "SKS02"), which may be provided to the key derivation function to generate Derived Group Key m−2 (which may be labeled as "SKS03"), which may be provided to the key derivation function to generate Derived Group Key 1 (which may be labeled as "SKS0m").

Although various embodiments disclosed herein are described in connection with generating four derived group keys, it will be appreciated that any suitable number m of derived group keys may be used. In some embodiments, a single derived group key may be employed. In further embodiments, including the various illustrated examples and embodiments described herein, a plurality of derived group keys may be used.

Like the aforementioned derived device keys, in certain embodiments where the key derivation function comprises a one-way function, if one derived key of a plurality of derived keys is compromised it may not necessarily comprise other derived keys (and/or a subset of the derived keys). For example, if Derived Group Key 1 is compromised, Derived Group Keys m, m−1, and m−2 may not be compromised. If Derived Group Key 2 is compromised, Derived Group Key 1 may also be compromised, but Derived Group Keys 3 and 4 may not be compromised. Using a series of derived group keys consistent with embodiments disclosed herein may therefore provide a measure of improved security and key redundancy in connection with various aspects of the disclosed CAS implementations.

In some embodiments, one or more derived device keys may be generated once for each device and/or once per unique device key issued to a client device. In certain embodiments, one or more derived group keys may be generated for each broadcast service operator. For example, when a client device is tuned to a particular broadcast operator service and/or when the client device runs an application associated with a particular broadcast service for the first time, one or more derived group keys specific to the broadcast operator may be generated. The derived group keys and/or any other operator-specific information including operator licenses may be stored in a database specific to the particular operator. Therefore, if a client device is tuned to multiple broadcast service operators and/or applications associated with multiple operators are run on the device, multiple derived group key sets may be generated and stored in associated operator-specific databases. In various embodiments, when decrypting a license and/or an associated CK, the client device may begin with accessing (if available) derived keys associated with the specific broadcast operator that the client device is currently bound to and/or generating the derived keys for the bound broadcast operator.

License Decryption Using Derived Keys

Consistent with various aspects of the disclosed embodiments, derived device and/or group keys may be used by a client device to decrypt a license and/or a CK received in connection with a broadcast TS (e.g., a license and/or content key included in an EMM of a broadcast TS). In some embodiments, a client device may not be initially aware of which device and/or group key of a plurality of derived device and/or group keys will successfully decrypt the license and/or CK. That is, the client device may not be aware of the specific key used by the license service to encrypt the license and/or CK. As discussed in more detail below, to decrypt the license and/or CK, the client device may attempt to use the terminal (i.e., the last in the series) derived device and/or group key in a series of derived device and/or group keys (e.g., Derived Device Key 4 and/or Derived Group Key 4 in the illustrated example). If the first attempt at decryption is unsuccessful, the client device may attempt to decrypt the license and/or content key with the preceding derived device and/or group key in the series of derived keys, working back through the series of derived keys until the license and/or CK is successfully decrypted and/or the initial derived CK is used.

Figure 4:
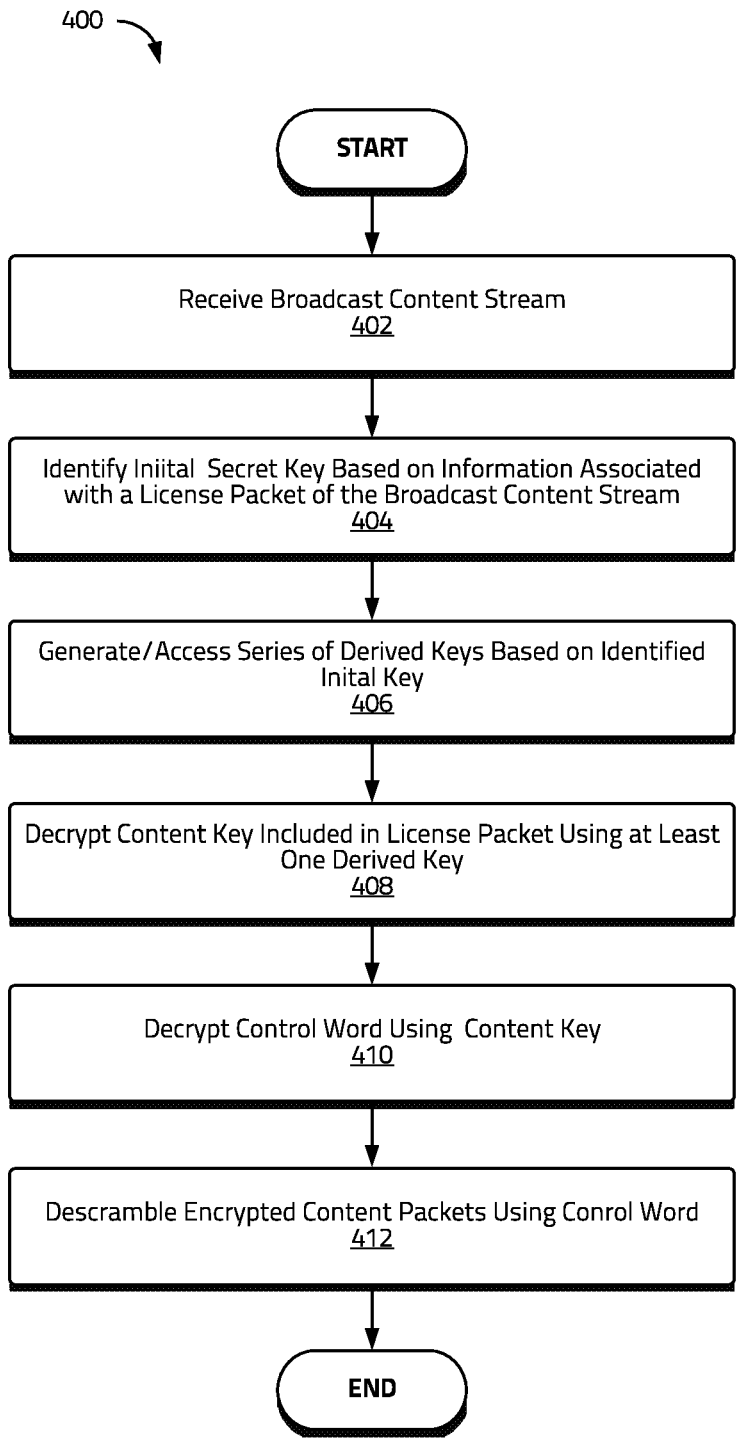
FIG. 4 illustrates an example of a content key decryption process using one or more derived keys consistent with various embodiments of the present disclosure.

FIG. 4 illustrates an example of a CK decryption process 400 using one or more derived keys consistent with various embodiments of the present disclosure. The illustrated process 400 and/or aspects thereof may be performed by and/or in conjunction with software, hardware, firmware, and/or any combination thereof. In various embodiments, the process 400 may be performed by a client device in connection with decrypting a CK used to decrypt a control word for descrambling content included in a broadcast TS.

At 402, the client device may receive a broadcast content stream. In certain embodiments, the broadcast content stream may comprise an MPEG-2 encoded TS. The broadcast content stream may comprise a plurality of encrypted content packets that, in some embodiments, may be encrypted using at least one CW. The broadcast content stream may further comprise an encrypted CW packet comprising an encrypted version of the at least one CW and at least one license packet.

The at least one license packet may be processed by the client device. For example, at 404, information associated with the at least one license packet may be used to identify an initial secret key provisioned to the client device. In some embodiments, the information may comprise target information associated with the at least one license packet.

Consistent with embodiments disclosed herein, the initial secret key may comprise a unique device key, a manufacturer group key, and/or an operator group key. A series of derived keys based, at least in part, on the initial secret key may be generated and/or accessed at 406. In some embodiments, the client device may check to determine whether a set of derived keys has been previously generated and/or otherwise been stored by the device (e.g., stored in an operator-specific database and/or the like) based, at least in part, on the identified initial secret key and/or associated information. For example, when a client device is tuned to a particular broadcast operator service and/or when the client device runs an application associated with a particular broadcast service for the first time, one or more derived group keys specific to the broadcast service operator may be generated. The derived group keys and/or any other operator-specific information including operator licenses may be stored in a database specific to the particular operator. If the keys have been previously generated and stored, the client device may access the stored derived keys. In further embodiments, the client device may generate the derived series of keys using various techniques described above in reference to FIG. 3.

At 408, the content key included in the license packet may be decrypted using at least one derived key of the series of derived keys. In some embodiments, the client device may attempt to use the final and/or terminal derived key in the series of derived keys. If the first attempt at decryption is unsuccessful, the client device may attempt to decrypt the license and/or CK with the preceding derived key in the series of derived keys, working back through the series of derived keys until the license and/or CK is successfully decrypted and/or the initial derived content key is used.

The encrypted CW included in the at least one encrypted CW packet of the broadcast content stream may be decrypted at 410 using the decrypted CK. Using the decrypted control word, the content stream may be descrambled and/or otherwise decrypted at 412 for rendering by the client device.

Broadcast Content Scrambling and License Generation

Figure 5:
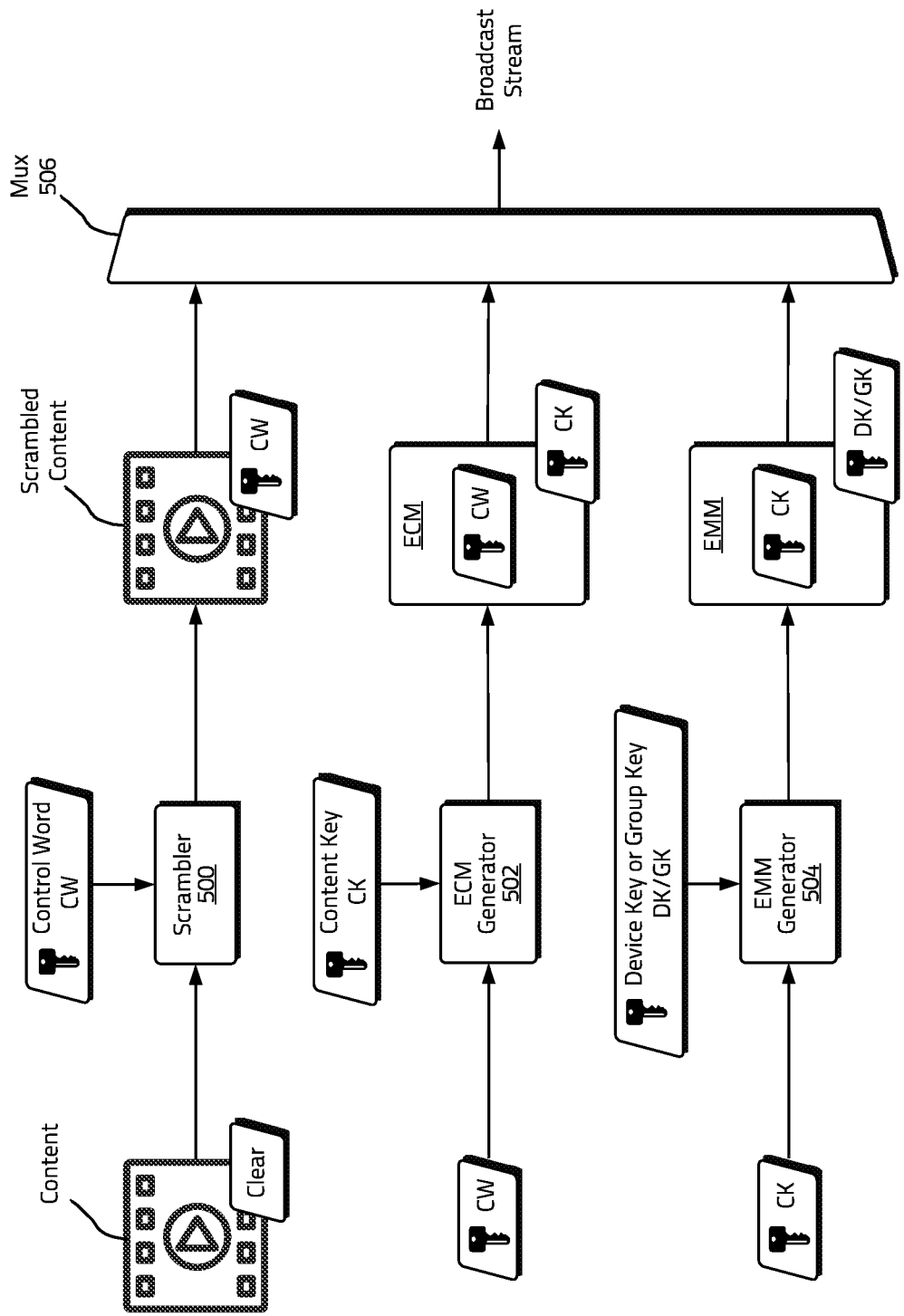
FIG. 5 illustrates an example of a content scrambling and license generation and distribution process consistent with various embodiments of the present disclosure.

FIG. 5 illustrates an example of a content scrambling and license generation and distribution process consistent with various embodiments of the present disclosure. As shown, a broadcast service operator may scramble and/or encrypt a cleartext content stream using a CW with a DVB scrambler 500 to generate a scrambled content stream and/or associated scrambled and/or otherwise encrypted content packets. In certain embodiments, the DVB scrambler 500 may use DVB Content Scrambling Algorithm ("CSA") 2 and/or CSA3 in connection with scrambling and/or otherwise encrypting the cleartext content stream using the CW, although other suitable scrambling and/or encryption algorithms may also be used (e.g., CSA1, Advanced Encryption Standard ("AES"), and/or the like).

In some embodiments, the broadcast service operator may provide the CW to a license service (and/or another associated service). In further embodiments, the license service and/or other associated service may provide the CW to the broadcast service for use in connection with scrambling the cleartext content stream, and may thus not necessarily need to receive the CW from the broadcast service operator.

The license service and/or other associated service may generate a CK (and/or may request a CK from a key service). An encrypted CW packet, which in some embodiments, may comprise an ECM packet, may be generated by the license service and/or associated service by encrypting the CW with the CK. The encrypted CW may be included in the encrypted CW packet. For example, as illustrated, the license service and/or another associated service may use an ECM generator 502 to generate an ECM packet that includes the CW encrypted with the CK.

The license service may further generate a license packet, which in some embodiments may comprise an EMM packet, by encrypting the CK with a device and/or group key (e.g., a manufacturer group key and/or operator group key) and/or a key derived either directly or indirectly therefrom. The encrypted CK may be included the license packet. For example, as illustrated, the license service may use an EMM generator 504 to generate an EMM packet that includes the CK encrypted with the device and/or group key (e.g., a manufacturer and/or operator group key) and/or a key derived either directly or indirectly therefrom. For example, in some embodiments, the license service may engage in a key derivation process illustrated and described above in connection with FIG. 3 to generate a series of device and/or group keys and may encrypt the CK with at least one of the derived keys of the series of derived keys.

The license and/or EMM packet and/or the encrypted CW and/or ECM packet may be provided to the broadcast service operator, which use a multiplexer 506 to multiplex the license and/or EMM packets and the encrypted CW and/or ECM packets with the scrambled content stream packets. The multiplexed signal may then be broadcast to one or more client devices.

In some embodiments, the license and/or EMM packet may be delivered separately from the encrypted CW and/or ECM packet and/or the scrambled content stream packets. For example, in an implementation where the client device may comprise a connected broadcast device connected to a broadband network and/or the internet, licenses and/or EMM packet information may be delivered separately from content. For example, licenses and/or EMM packet information may be delivered to a connected broadcast device from a broadcast service operator, a license service, and/or another connected service via a network connection such as the internet. In some embodiments, a connected broadcast device may, for example and without limitation, obtain licenses and/or EMM packet information directly from a license service and/or another connected service via a broadband and/or Internet communication channel while consuming protected broadcast content.

License Targeting

Figure 6:
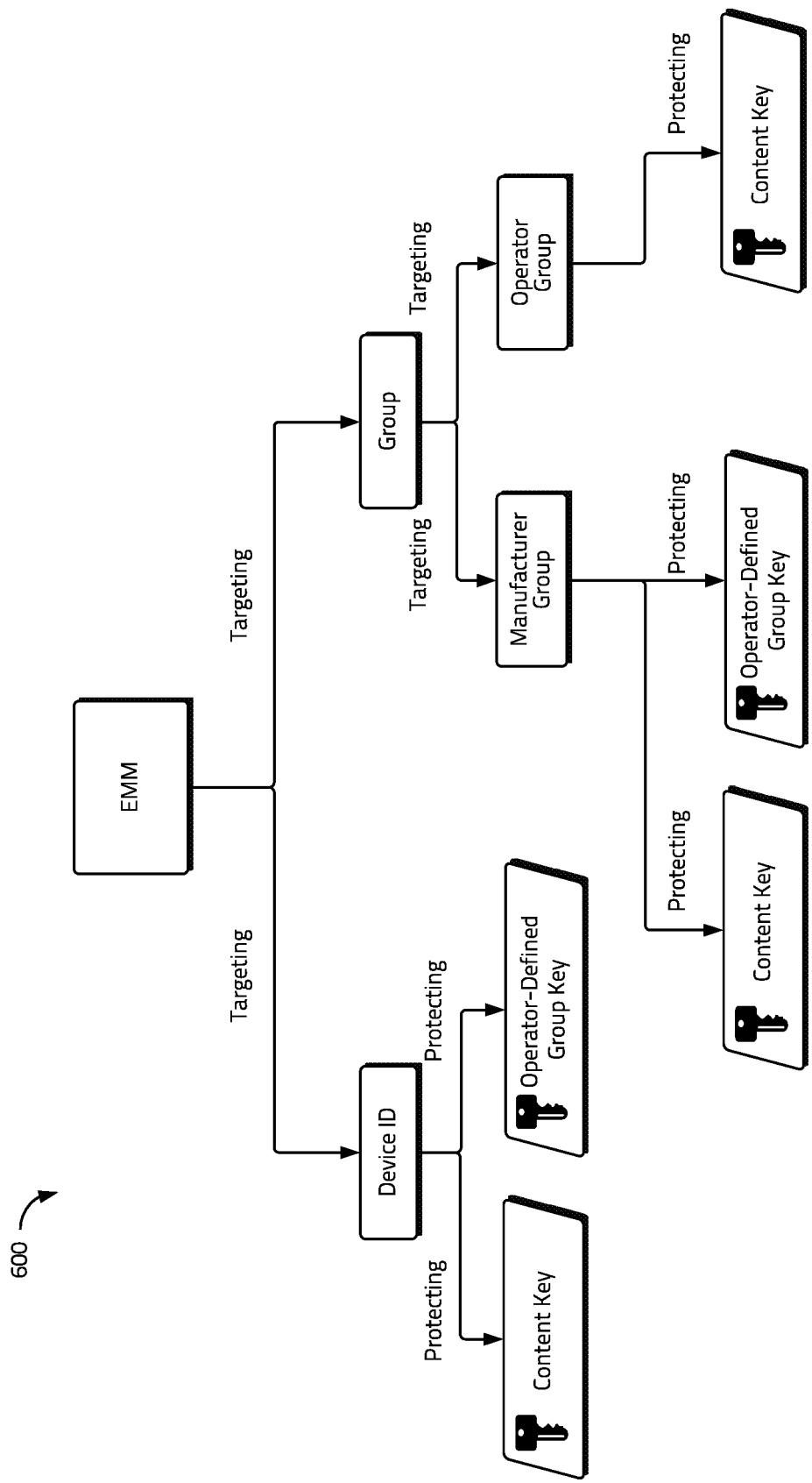
FIG. 6 illustrates a conceptual diagram showing an example of certain types of license targeting consistent with various embodiments of the present disclosure.

FIG. 6 illustrates a conceptual diagram 600 showing an example of various types of license targeting consistent with various embodiments of the present disclosure. As discussed above, in various embodiments, a license may be packaged in an EMM of a broadcast TS. In certain embodiments, an EMM may be associated with and/or otherwise include targeting address information. The targeting address information may identify whether an EMM is targeting a particular device and/or a group of devices.

For example, as illustrated, an EMM may target a particular device ID. An EMM targeting a particular device ID may be used to protect a content key and/or an operator group key. An EMM may also target a group of devices. For example, as illustrated, an EMM targeting a group of devices may comprise a group of devices associated with a particular manufacturer (e.g., all devices sharing a particular Group0 key or the like) and/or a group of devices associated with a particular broadcast service operator. An EMM targeting a group of devices associated with a particular manufacturer may be used to protect a CK and/or an operator group key. An EMM targeting a group of devices associated with a particular broadcast service operator may be used to protect a CK.

Figure 7:
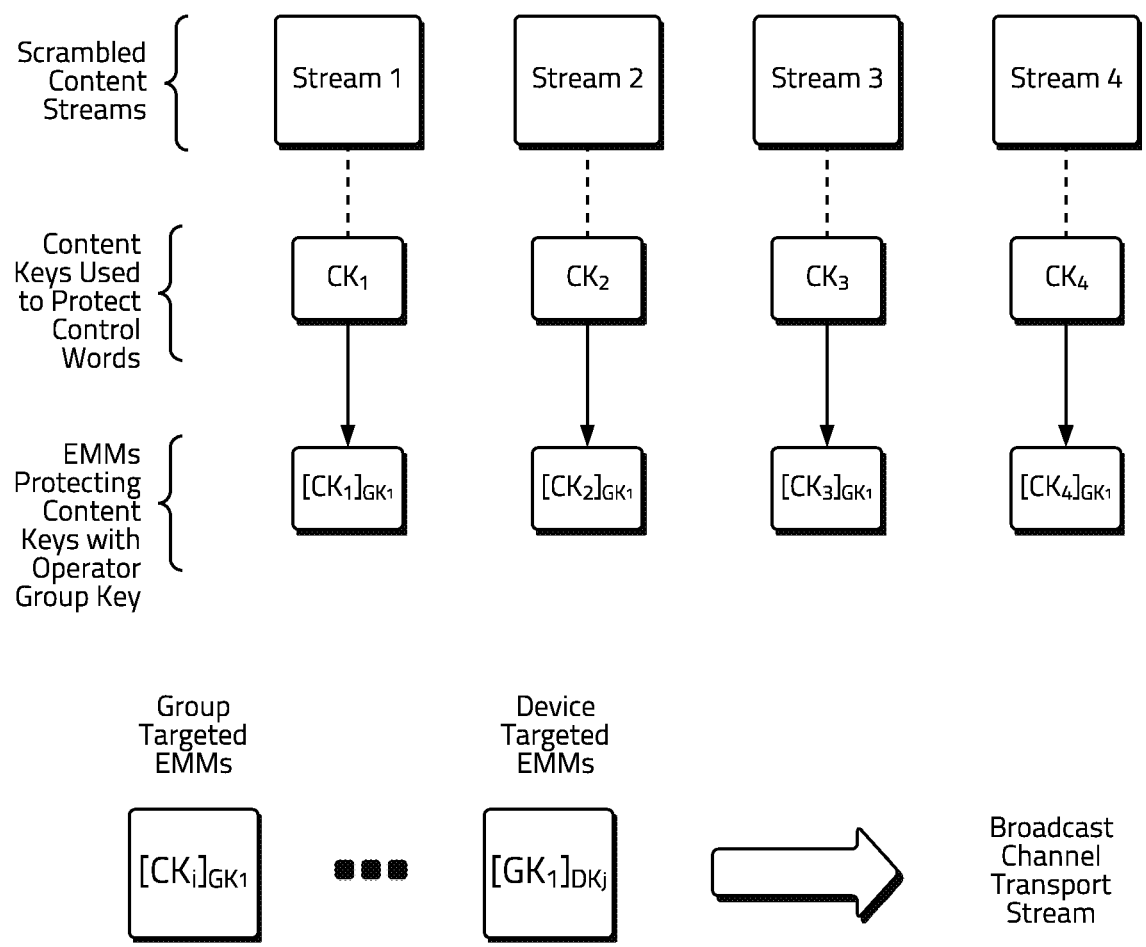
FIG. 7 illustrates a conceptual diagram of an example of generating licenses associated with a set of channels targeted to a group of devices consistent with various embodiments of the present disclosure.

FIG. 7 illustrates a conceptual diagram 700 of an example of generating licenses associated with a set of channels targeted to a group of devices consistent with various embodiments of the present disclosure. A broadcast service operator may scramble a plurality of content streams— streams 1-4. In some embodiments, each stream of the plurality of content streams may be associated with a particular channel offered by the broadcast service operator. In certain embodiments, the channels may be associated with a particular package and/or channel grouping offered by the broadcast service operator.

Although not specifically illustrated in connection with FIG. 7, each content stream of plurality of content streams may be scrambled and/or otherwise encrypted using a CW. In some embodiments, each of the plurality of content streams may be scrambled and/or encrypted using different CWs. CWs may be protected using one or more content keys $CK_1$-$CK_4$. By protecting the CWs, different CKs may therefore be used to indirectly protect the content streams. For example, in the illustrated diagram 700, a CW used to scramble Content Stream 1 may be encrypted using content key $CK_1$, a CW used to scramble Content Stream 2 may be encrypted using content key $CK_2$, a CW used to scramble Content Stream 3 may be encrypted using content key $CK_3$, and a CW used to scramble Content Stream 4 may be encrypted using content key $CK_4$.

One or more licenses, which may be packaged in one or more EMMs, may be generated that protect the CKs using one or more operator group keys. In various embodiments, the CK may be common to all content programs of a given service provided by the content service provider. In further embodiments, a content service provider may use individual (e.g., different) CKs for specific content programs.

Moreover, in certain embodiments, different CKs may protect different parts and/or aspects of different parts of a content stream. For example and without limitation, a first CK may be used to protect video content associated with the content stream, a second CK may be used to protect English-language audio content associated with the content stream, and a third CK may be used to protect Spanish-language audio content associated with the content stream. Thus it will be appreciated that various examples illustrated and described herein may be simplified for the purposes of illustration and explanation, and should not be viewed as limiting.

In some embodiments, CKs may be protected by encrypting the CKs with operator group keys. In various embodiments, EMMs may be generated that include each CK encrypted using the same operator group key. For example, in the illustrated diagram 700, $CK_1$ may be encrypted with an operator group key $GK_1$, which may be denoted in certain instances herein as $[CK_1]_{GK_1}$, $CK_2$ may be encrypted with the operator group key $GK_1$, which may be denoted in certain instances herein as $[CK_2]_{GK_1}$, $CK_3$ may be encrypted with the operator group key $GK_1$, which may be denoted in certain instances herein as $[CK_3]_{GK_1}$, and $CK_4$ may also be encrypted with the operator group key $GK_1$, which may be denoted in certain instances herein as $[CK_4]_{GK_1}$. In this manner, group targeted EMMs may be generated for broadcasting to client devices comprising $[CK_i]_{GK_1}$, where i=1 . . . k, with k being the number of total associated content streams.

Device targeted EMMs may be further generated for broadcasting to a client device. In some embodiments, the device targeted EMMs may comprise the operator group key encrypted with a device key of a particular targeted device. For example, in the illustrated diagram, EMMs may be generated by encrypting the operator group key $GK_1$ with the device keys of one more targeted client devices, which may be denoted in certain instances herein as $[GK_1]_{DK_j}$, where j=1 n, with n being the number of total targeted devices. The device targeted EMMs including $[GK_1]_{DK_j}$, the group targeted EMMs $[CK_i]_{GK_1}$, and the scrambled content packets may be broadcast by the broadcast service operator as part of the broadcast content TS.

Upon receipt of the broadcast content TS and/or an associated device targeted EMM, a client device may use its device key and/or a key derived therefrom to decrypt the encrypted group key included in the EMM. Using the decrypted group key and/or a group key derived therefrom, the client device may decrypt an encrypted CK include group targeted EMM. The decrypted CK may be used to decrypt a CW included in an encrypted CW packet and/or an ECM included in the broadcast content stream, which in turn may be used to descramble the scrambled content stream included in the broadcast content TS.

EMM addressing may be used to target licenses and/or associated protected CKs to particular devices and/or groups of devices provisioned with associated keys. In some embodiments, a broadcast service operator may target an EMM to devices possessing a particular group key. For example and without limitation, in some implementations, a manufacturer group key (e.g., a Group0 key) may be used to directly encrypt a CK included in an EMM associated with a broadcast channel Any device possessing the same manufacturer group key may thus be able to descramble the broadcast channel when such an EMM is received.

In some embodiments, an EMM and/or an associated license may comprise an operator group key encrypted using a manufacturer group key (e.g., a Group0 key). Such an EMM may use the manufacturer group key to deliver and/or protect the operator group key. The EMM may be delivered to a client device via the broadcast channel targeting the manufacturer group key. Upon receipt, a client device that possesses the manufacturer group key may decrypt the operator specific group key and stores the decrypted operator group key in an associated operator database. The operator may then issue EMMs to the client device targeting the operator specific group. This implementation may, among other things, allow a broadcast to provide free-to-air channels that can be watched by any user without necessarily the need for a subscription and/or may allow for delivery of promotional content (e.g., one month of a free subscription to new users and/or the like).

In further embodiments, an EMM may be used to deliver an operator group key to a specific device. For example and without limitation, an operator may wish to send an entitlement to a set of channels to a single device (e.g., a single subscribing device). In such an implementation, the operator group key may be encrypted with a device key associated with the client device and/or a key derived therefrom and sent via an EMM targeting the client device. Once the client device has been provisioned with the operator group key via the EMM, another EMM may be sent to deliver the protected CK targeting the operator group key, which the client device may then access using the provisioned operator group key and/or a key derived therefrom. In this manner, a particular client device may be granted access to a particular set of channels by the broadcast service operator.

In yet further embodiments, a client device may be directly entitled by a broadcast service operator to access a particular channel (e.g., as may be the case with pay-per-view content and/or the like). For example, an operator may encrypt a CK associated with a broadcast channel directly with a device key and/or a key derived therefrom. An associated EMM may be delivered to the client device targeting the client device and/or associated device key.

In certain embodiments, an EMM may comprise target address information (which in certain instances may be referred to as target information). The target information may be used to target the EMM to one or more devices. A client may examine the target information of received EMMs to determine which EMMs are intended or are not intended for the device and/or an associated group. For example and without limitation, a client device may receive several EMMs per second as part of a DVB channel. Due to processing limitations, the client device may first process EMMs that have associated IDs that are new to the client device. The client device may then process EMMs that comprise target information associated with the client device's device key and/or an associated device ID, device's manufacturer group key and/or an associated ID, and/or operator group key and/or an associated ID. That is, the client device may process EMMs that are associated with device and/or group keys the client device possesses and/or keys that can be derived from keys that the client device possesses. If the device does not possess such a key, the particular EMM may be discarded, like any other EMM with associated targeting information that does not correspond with keys in possession of the client device and/or keys that may be derived by the client device.

In certain embodiments, EMMs may be signed to verify that associated information (e.g., license information) has not been tampered with during transfer. When a client device determines than an EMM may be processed, it may check a signature associated with the EMM. If the signature check, which in certain embodiments may comprise a hash-based message authentication code ("HMAC") signature check, determines that the signature is valid and that the EMM and/or associated information has not been tampered with, the EMM may be processed by the client device. Otherwise, the client device may discard the EMM.

As discussed above, in some embodiments, an HMAC signature check may be used to determine an EMM and/or a portion thereof is authentic and/or otherwise has not been tampered with prior to processing the EMM by the client device. In some embodiments, the HMAC signature of an EMM may be generated using a key, a portion of a key, and/or information generated using a key and/or a portion thereof (e.g., a hash of a key and/or a portion thereof) that is associated with a device and/or group targeted by the EMM. For example, in certain embodiments, the HMAC signature of an EMM and/or a portion thereof may be generated using a hash and/or a portion of a hash of a device key, a manufacturer group key, an operator group key, and/or associated derived keys associated with a device and/or group that is targeted by the EMM. In certain implementations, this may create an association between the HMAC signature used to verify an EMM and a device and/or group and/or associated keys or derived keys targeted by the EMM.

Client Device Configuration and Configuration States

Figure 8:
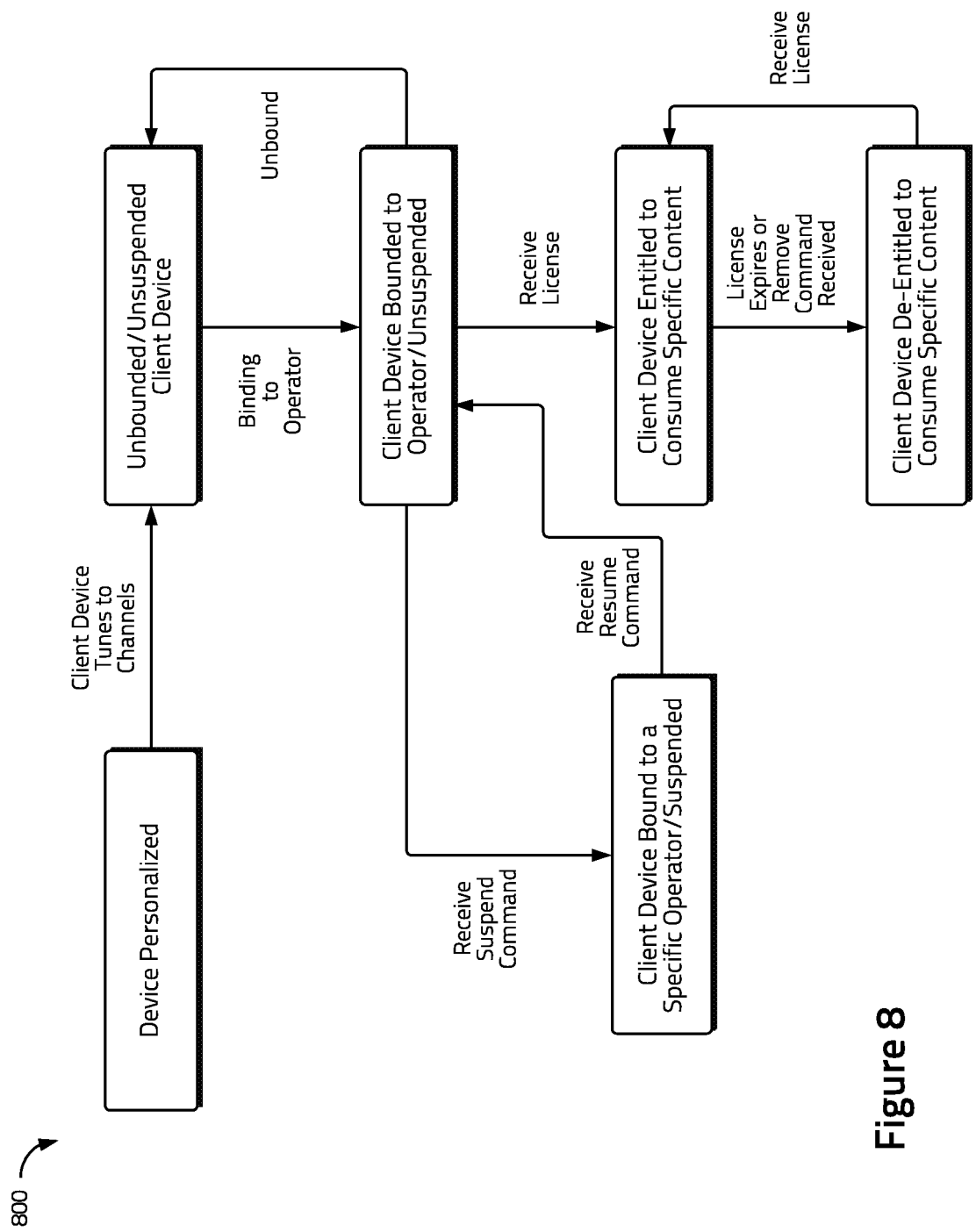
FIG. 8 illustrates a diagram showing an example of a client device operator configuration process and associated configuration states consistent with various embodiments of the present disclosure.

FIG. 8 illustrates a diagram 800 showing an example of a client device operator configuration process and associated configuration states consistent with various embodiments of the present disclosure. As shown, following and/or during the manufacturing process, a client device may be personalized. In certain embodiments, as part of this personalization process, the client device may be provisioned with one or more keys and/or other associated information. For example, a client device may be provisioned with one or more device personalization packets that may include one or more unique device keys, group keys (e.g., Group0 keys), and/or associated IDs.

In various embodiments, a client device may be personalized via an online personalization process where the device may acquire personalization information automatically from a device manufacturer and/or another key and/or licensing provisioning service, or an offline personalization service where the device may acquire personalization information through flashing into a chipset of a client device during one of the manufacturing phases. In connection with connected broadcast client devices, in certain embodiments, a broadcast service operator may trigger the online acquisition of the device personality upon the activation of a user subscription via a content service subscriber management system.

After personalization, a client device may be tuned to a particular broadcast channel and/or an operator application on the device may be opened on the client device. A client device may be initially unbound to a particular broadcast service operator. Additionally, as described below, a client device bound to a particular broadcast service operator may be either suspended and/or unsuspended. After a user accepts any applicable service agreement terms, the client device may be bound to a particular operator. As part of this process, the client device may generate a database associated with the broadcast service operator to store EMMs, licenses, key, and/or other information associated with the operator.

A client device that is bound to a particular broadcast service operator and unsuspended may be considered entitled and can consume content. The client device may receive licenses including key information that may be used by the device to descramble content received from the broadcast service operator for rendering by the device consistent with various aspects of the embodiments describe herein. If a license expires or a remove command is received from a broadcast service operator (e.g., a remove command packaged in an EMM), the client device may be considered de-entitled and be unable to consume previously licensed content. A client device may also become unbound to a particular operator, returning the client device to an unbounded and unsuspended client device.

In further embodiments, a client device may receive a suspend command from a broadcast service operator (e.g., a suspend command packaged in an EMM). Upon receipt, the client device may remain bound to the operator, but may become suspended until a resume command is received from the broadcast service operator (e.g., a resume command packaged in an EMM).

Figure 9:
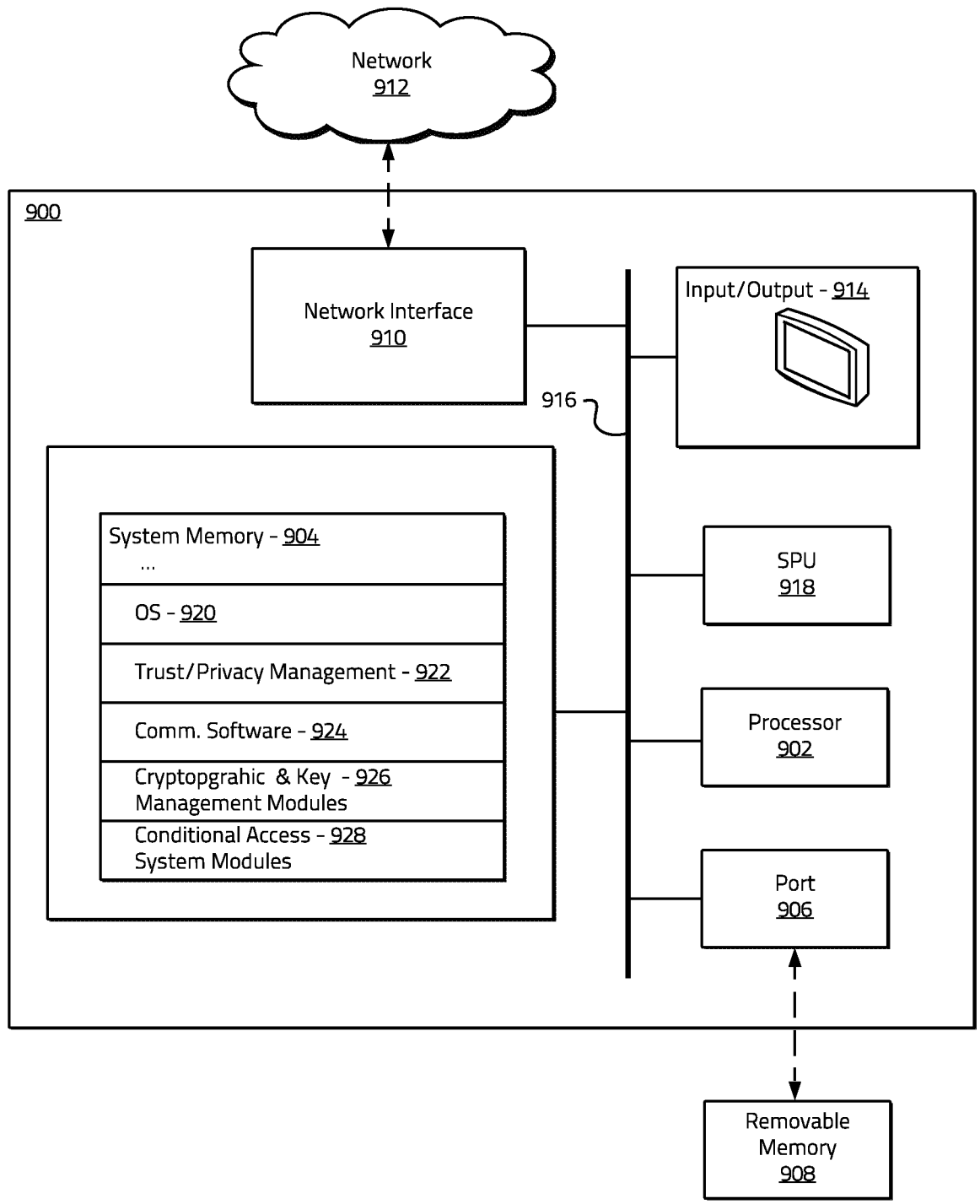
FIG. 9 illustrates an example of a system that may be used to implement certain embodiments of the systems and methods of the present disclosure.

FIG. 9 illustrates an example of a system 900 that may be used to implement certain embodiments of the systems and methods of the present disclosure. The system 900 of FIG. 9 may comprise a system and/or device associated with client device (e.g., a TV and/or set top box), a broadcast content service, a key and/or license service, and/or any other service/system configured to implement embodiments of the disclosed systems and methods.

Various systems and/or devices associated with embodiments of the disclosed systems and/or methods may be communicatively coupled using a variety of networks and/or network connections. In certain embodiments, the network may comprise a variety of network communication devices and/or channels and may utilize any suitable communications protocols and/or standards facilitating communication between the systems and/or devices. The network may comprise the Internet, a local area network, a virtual private network, and/or any other communication network utilizing one or more electronic communication technologies and/or standards (e.g., Ethernet or the like). In some embodiments, the network may comprise a wireless carrier system such as a personal communications system ("PCS"), and/or any other suitable communication system incorporating any suitable communication standards and/or protocols. In further embodiments, the network may comprise an analog mobile communications network and/or a digital mobile communications network utilizing, for example, code division multiple access ("CDMA"), Global System for Mobile Communications or Groupe Special Mobile ("GSM"), frequency division multiple access ("FDMA"), and/or time divisional multiple access ("TDMA") standards. In certain embodiments, the network may incorporate one or more satellite communication links, broadcast communication links, and/ or the like. In yet further embodiments, the network may utilize IEEE's 802.11 standards, Bluetooth®, ultra-wide band ("UWB"), Zigbee®, and or any other suitable standard or standards.

Various systems and/or devices associated with the disclosed embodiments may comprise a variety of computing devices and/or systems, including any computing system or systems suitable to implement the systems and methods disclosed herein. For example, the connected devices and/or systems may comprise a variety of computing devices and systems, including laptop computer systems, desktop computer systems, server computer systems, distributed computer systems, smartphones, tablet computers, and/or the like.

In certain embodiments, the systems and/or devices may comprise at least one processor system configured to execute instructions stored on an associated non-transitory computer-readable storage medium. As discussed in more detail below, the client device and/or one or more other systems and/or services may further comprise a secure processing unit ("SPU") configured to perform sensitive operations such as trusted credential and/or key management, cryptographic operations, secure policy management, and/or other aspects of the systems and methods disclosed herein. The systems and/or devices may further comprise software and/ or hardware configured to enable electronic communication of information between the devices and/or systems via a network using any suitable communication technology and/ or standard.

As illustrated in FIG. 9, a system 900 may include: a processing unit 902; system memory 904, which may include high speed random access memory ("RAM"), non-volatile memory ("ROM"), and/or one or more bulk non-volatile non-transitory computer-readable storage mediums (e.g., a hard disk, flash memory, etc.) for storing programs and other data for use and execution by the processing unit; a port 906 for interfacing with removable memory 908 that may include one or more diskettes, optical storage mediums (e.g., flash memory, thumb drives, USB dongles, compact discs, DVDs, etc.) and/or other non-transitory computer-readable storage mediums; a network interface 910 for communicating with other systems via one or more network connections 912 using one or more communication technologies, including any of the network connections and/or communication technologies and/or standards described herein; a user interface 914 that may include a display and/or one or more input/output devices such as, for example, a touchscreen, a keyboard, a mouse, a track pad, and the like; and one or more busses 916 for communicatively coupling the elements of the system.

In some embodiments, the system may, alternatively or in addition, include an SPU 918 and/or a trusted execution environment that is protected from tampering by a user of the system or other entities by utilizing secure physical and/or virtual security techniques. An SPU 918 and/or a TEE can help enhance the security of sensitive operations such as personal information management, trusted credential and/or key management, privacy and policy management, license management and/or enforcement, and other aspects of the systems and methods disclosed herein. In certain embodiments, the SPU 918 and/or TEE may operate in a logically secure processing domain and be configured to protect and operate on secret information, as described herein. In some embodiments, the SPU 918 and/or TEE may include internal memory storing executable instructions or programs configured to enable the SPU 918 and/or TEE to perform secure operations, as described herein.

The operation of the system may be generally controlled by a processing unit 918 and/or an SPU 918 and/or TEE operating by executing software instructions and programs stored in the system memory 904 (and/or other computer-readable media, such as removable memory 908). The system memory 904 may store a variety of executable programs or modules for controlling the operation of the system 900. For example, the system memory 904 may include an operating system ("OS") 920 that may manage and coordinate, at least in part, system hardware resources and provide for common services for execution of various applications and a trust and privacy management system 922 for implementing trust and privacy management functionality including protection and/or management of personal data through management and/or enforcement of associated policies. The system memory may further include, without limitation, communication software 924 configured to enable in part communication with and by the system, one or more applications, cryptographic operation and key management and processing modules 926 configured to perform various aspects of the disclosed embodiments (e.g., cryptographic key operations, signature generation, license enforcement, etc.), a CAS module 928 configured to perform certain CAS functions described herein, and/or any other information and/or applications configured to implement embodiments of the systems and methods disclosed herein.

The systems and methods disclosed herein are not inherently related to any particular computer, electronic control unit, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic disk, flash memory, integrated circuits, or any other non-transitory digital processing apparatus memory device.

Although the foregoing has been described in some detail for purposes of clarity, it will be apparent that certain changes and modifications may be made without departing from the principles thereof. For example, it will be appreciated that a number of variations can be made to the various embodiments, devices, services, and/or components presented in connection with the figures and/or associated description within the scope of the inventive body of work, and that the examples presented in the figures are provided for purposes of illustration and explanation, and not limitation. It is further noted that there are many alternative ways of implementing both the systems and methods described herein. Accordingly, the present embodiments are to be considered as illustrative and not restrictive, and the embodiments of the invention are not to be limited to the details given herein, but may be modified within the scope and equivalents of the appended claims.

What is claimed is:

1. A method for managing electronic content performed by a client device comprising a processor and a non-transitory computer-readable medium storing instructions that, when executed by the processor, cause the client device to perform the method, the method comprising:
   receiving, by the client device, a broadcast content stream, the broadcast content stream comprising a plurality of encrypted content packets, at least one encrypted control word packet comprising at least one encrypted control word, and at least one license packet, the plurality of encrypted content packets being encrypted using the at least one control word;
   processing, by the client device, the at least one license packet, wherein processing the at least one license packet comprises:
      identifying target information associated with the at least one license packet;
      identifying an initial secret key provisioned to the client device based, at least in part, on the target information;
      generating a series of derived keys, the series of derived keys comprising a plurality of derived keys derived based, at least in part, on the initial secret key;
      decrypting a content key included in the at least one license packet using at least one of the derived keys in the series of derived keys; and
   decrypting the control word included in the at least one encrypted control word packet using the decrypted content key; and
   descrambling the broadcast content stream by decrypting the plurality of encrypted content packets using the decrypted control word.

2. The method of claim 1, wherein decrypting the content key included in the at least one license packet using the at least one of the derived keys in the series of derived keys comprises:
   attempting to decrypt the content key using a terminal derived key in the series of the derived keys;
   determining that the decryption of the content key using the terminal derived key was unsuccessful; and
   decrypting the content key with a derived key preceding the terminal derived key in the series of derived keys.

3. The method of claim 1, wherein the initial secret key comprises a unique device key.

4. The method of claim 1, wherein the initial secret key comprises a group key.

5. The method of claim 4, wherein the group key comprises a manufacturer group key.

6. The method of claim 4, wherein the initial secret key comprises an operator group key.

7. The method of claim 6, wherein the operator group key is associated with a particular broadcast service operator.

8. The method of claim 7, wherein the method further comprises storing the generated series of derived keys in a database managed by the client device associated with the particular broadcast service operator.

9. The method of claim 1, wherein the method further comprises receiving, at the client device, a request to render the broadcast content stream.

10. The method of claim 9, wherein the method further comprises rendering, by the client device, the descrambled broadcast content stream.

11. The method of claim 1, wherein the broadcast content stream comprises an MPEG-2 encoded transport stream.

12. The method of claim 1, wherein the at least one license packet comprises an entitlement management message packet.

13. The method of claim 1, wherein the at least one encrypted control word packet comprises an entitlement control message packet.

14. The method of claim 1, wherein the series of derived keys is generated using, at least in part, a key derivation function.

15. The method of claim 14, wherein the key derivation function comprises a one-way key derivation function.

16. The method of claim 1, where the client device comprises a television.

17. The method of claim 1, wherein the client device comprises a set top box.

18. The method of claim 1, wherein the client device comprises a conditional access module.

\* \* \* \* \*